United States Patent [19]

Edmondson et al.

[11] 4,004,185

[45] Jan. 18, 1977

[54] ELECTRIC LIGHTING SYSTEMS

[75] Inventors: Harry Edmondson; Walter Whittaker, both of Burnley, England

[73] Assignee: E. W. Controls Limited, Burnley, England

[22] Filed: Apr. 25, 1975

[21] Appl. No.: 571,509

[30] Foreign Application Priority Data

Apr. 27, 1974 United Kingdom ............ 18558/74

[52] U.S. Cl. .............................. 315/105; 315/278; 315/DIG. 7; 331/113 A
[51] Int. Cl.² ....................................... H05B 41/29
[58] Field of Search ............ 315/DIG. 7, 105, 246, 315/276, 278; 331/113 A

[56] References Cited
UNITED STATES PATENTS

| | | | |
|---|---|---|---|
| 2,895,081 | 7/1959 | Crowhouer et al. | 315/DIG. 7 |
| 2,982,881 | 5/1961 | Reich | 315/DIG. 7 |
| 3,501,674 | 3/1970 | Moore | 315/DIG. 7 |

*Primary Examiner*—R. V. Rolinec
*Assistant Examiner*—Darwin R. Hostetter
*Attorney, Agent, or Firm*—Finnegan, Henderson, Farabow & Garrett

[57] ABSTRACT

A method and apparatus of lighting a cold cathode electric gas discharge lamp in which the lamp is connected across the secondary winding of a voltage step-up transformer, and the primary winding of the transformer is energized with a chopped D.C. voltage having a frequency of at least 12 kHz and a voltage which provides an output voltage from the secondary winding having an R.M.S. value no greater than 700 volts.

10 Claims, 3 Drawing Figures

ELECTRIC LIGHTING SYSTEMS

Electric gas discharge lamps generally fall into one of two categories. There are hot cathode lamps in which the cathodes are heated to incandescence and cold cathode lamps in which the cathodes are not heated but are raised to a sufficiently high voltage that they act as "electron guns".

One example of a hot cathode lamp is a mercury vapour tube where the electrons ejected from the incandescent electrodes collide with the mercury atoms and cause these to emit radiation which consists for the most part of ultra violet rays, which are invisible. Such lamps, by themselves, give only a pale green/blue light, but they are frequently coated with a light-emitting substance (usually fluorescent or phosphorescent metallic salts such as calcium tungstate, zinc sulphide, or zinc silicate). When the ultra violet light strikes the fluorescent substance the invisible rays are transformed into visible light. These lamps are commonly referred to as fluorescent lamps. Because the cathodes are heated to incandescence (and thereby emit free electrons), hot cathode lamps have always been operated at much lower voltages than cold cathode lamps of the same wattage. Cold cathode lamps have therefore required much larger transformers and, because of the higher voltages, have been more dangerous and costly to operate. For this reason hot cathode fluorescent lamps are widely used for general lighting purposes whereas cold cathode lamps, such as neon tubes, are restricted to applications such as advertising display lighting.

In accordance with the present invention a method of lighting a cold cathode electric discharge lamp, comprises connecting the lamp across the secondary winding of a voltage step-up transformer, and energising the primary winding of the transformer with a chopped D.C. voltage having a frequency of at least 12 kHz. We have discovered that at these high frequencies cold cathode lamps can be operated at voltages much lower than would be expected, and it is therefore possible to operate both hot and cold cathode discharge lamps from essentially the same powerpack unit. The preferred frequency range for cold cathode lamps is 20 kHz to 60 kHz.

Although powerpack units operating at these high frequencies have already been produced for lighting hot cathode lamps, it has not previously been thought possible to use them for lighting cold cathode lamps because it was assumed that the output voltages would not be sufficient.

The D.C. voltage may be supplied from a battery or from a rectified mains supply, and may range from 6V up to 110V, or even possibly to 240V. The cold cathode tube voltage will vary from about 150 to 200V for a 1 ft. tube up to about 600 to 700V for a 9 ft. tube. Conventionally a 9 ft. cold cathode lamp has been operated at about 1.25kV. Moreover, by driving the lamp through a transformer, the tube voltage is isolated from earth and the tubes are therefore safe to handle.

A major application for cold cathode lamps operated in accordance with the present invention will be for illuminating road traffic signs where the reduced current consumption should lead to substantial cost savings. At these high frequencies the secondary winding of the transformer produces a "choke-effect" which automatically limits the current flow through the lamp.

Conventionally electric gas discharge lamps have been driven from a mains supply and a choke has provided the high voltage surge required to ignite the lamp when the circuit is momentarily interrupted. The choke also acts as a ballast to limit the subsequent flow of current through the lamp. More recently transistorised inverter circuits have been introduced to provide battery-operated units which are smaller, more efficient, and give better lamp stability than mains operated units. Until now, however, these circuits have been costly and have introduced waveform distortion.

One reason for the high cost of inverter powerpacks for hot cathode fluorescent lamps has been that these lamps are sold in varying lengths corresponding to different wattages, and each length has required its own powerpack. Where the powerpack includes an output transformer, it has been found necessary to design a different transformer for each each tube length.

In accordance with a further feature of the present invention a power unit which overcomes this disadvantage comprises an inverter which includes a transistor and an output transformer and which, in use, oscillates at a predetermined resonant frequency of at least 12 kHz, the transformer having a feedback winding supplying a feedback voltage to the base of the transistor, and the circuit further including a resistance arranged to limit both the forward and reverse drive to the base of the transistor. In a preferred circuit, the resistance is connected in the feedback path between the feedback winding and the base of the transistor. By including this resistance in the feedback path, the number of turns in the feedback winding can be made greater than the number which would otherwise be required to provide the forward and reverse base drive to the transistor, and it is merely necessary to alter the value of the resistance in order to control the base current of the transistor. We have found that by selecting a suitable base current for each tube length it is possible to use a single transformer for different tube lengths. In practice this means that the ratio of the number of turns in the primary winding of the transformer to the number of turns in the feedback winding should not exceed 2 : 1 and is preferably about 1 : 1.

Another reason why present transistor inverter circuits for operating fluorescent lamps have not been widely accepted is that the single transistor circuits have only been capable of operating tubes of up to about 4 ft. in length. For lengths exceeding 4 ft. it has been necessary to design circuits using more than one transistor and this has increased both the initial and running costs of these units. We have found that one of the main reasons which has prohibited the use of single transistor inverter circuits for lengths exceeding 4 ft. has been the use of too fine (narrow gauge) wire for winding the transformer. By using a heavier gauge wire we have not only provided a basic single transistor inverter circuit which can be used for a wide range of tube lengths up to at least 9 ft. but we have found that a significant reduction in current drain from the D.C. power source is achieved. We have also found that this heavier gauge wire reduces the voltage peaks whenever the transistor is switched on or off and this has led to the use of a transistor having a much lower voltage rating. This in turn has led to improved performance, reduced waveform distortion, and reduced current consumption. Preferably, therefore, the primary and feedback windings are formed of wire having a diameter which is not less than 30 SWG (British Standard wire gauge). We have found that particularly good results are achieved with a wire gauge in the range 24 SWG to 26 SWG.

A further feature of the present invention lies in the manner in which the inverter circuit is tuned to its resonant frequency. We have found that by forming the transformer with two C- or U-shaped saturable iron cores having their open ends facing one another to form a closed loop, the stability of the inverter circuit at its resonant frequency can be improved by varying the gap between the two cores as a function of the resonant frequency. In practice the air gap is varied from a maximum of about 3 mm. at frequencies of 50 − 60 kHz (for cold cathode lamps) down to a very small gap or zero gap for hot cathode lamps where frequencies of around 15 − 20 kHz are used.

Although a 2 ft. cold cathode tube at present requires a transformer capable of generating a voltage of 500 volts while a 9 ft. tube requires a transformer capable of generating a voltage of 1¼ kV, we have found that by varying the resonant frequency of the inverter circuit a transformer having the same number of secondary turns can be used for different tube lengths. This is because the voltage required to operate a tube falls as the frequency is increased.

In order that the invention may be more clearly understood, one example of a powerpack unit for energising a hot or cold cathode discharge lamp will now be described with reference to the accompanying drawings in which.

Figure 1:
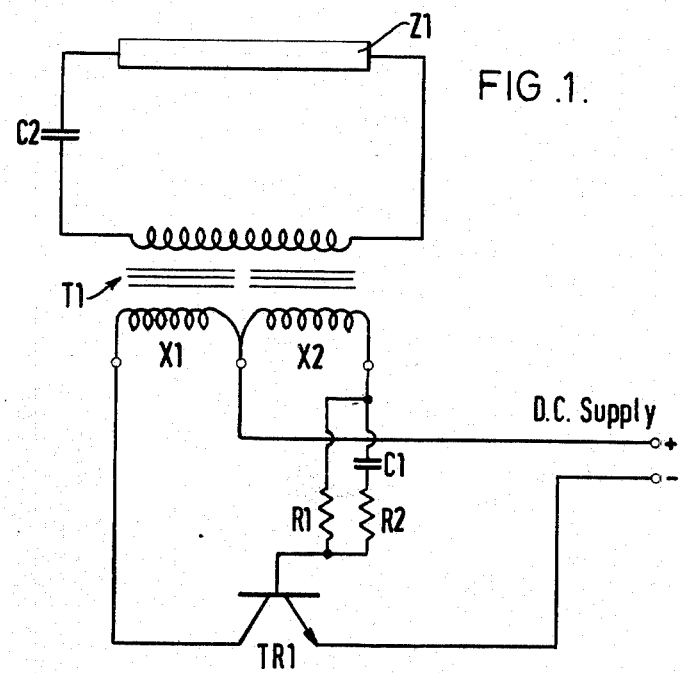
FIG. 1 is a circuit diagram of a single transistor inverter circuit.

Referring first to FIG. 1, a hot cathode gas discharge lamp Z1 is connected through a capacitor C2 across the secondary winding X3 of a transformer T1. The transformer is driven by a transistor inverter consisting of an n-p-n transistor TRI having its emitter connected to a negative D.C. input terminal and its collector connected to one end of the primary winding X1 of the transformer T1. The other end of the primary winding X1 is connected to a positive input terminal. In use, a D.C. power supply (which may be either a battery or a rectified A.C. supply) is connected across the two input terminals.

The charge/discharge characteristic of the capacitor C2 is chosen to provide an initial delayed voltage surge at switch-on, which produces a "hot-spot" on both cathodes to initiate the discharge in the lamp. It should be emphasised, however, that the hot cathode lamp can be replaced by a cold cathode lamp and that, in this case, the capacitor C2 is omitted. In general, the use of cold cathode lamps is preferred, but where existing fittings are designed for use with hot cathode lamps the present circuit can be substituted for the existing power supply.

A feedback winding X2 of transformer T1 has one end connected to the positive input terminal and its other end connected through a resistor R1 to the base of the transistor TRI. A capacitor C1 and resistor R2 are connected in series across the resistor R1. Thus, when a D.C. voltage appears across the input terminals the base of the transistor TRI is biased positively with respect to the emitter, the transistor therefore conducts, and the full D.C. voltage appears across the primary winding X1 of the transformer T1. The magnitude of the collector current through the winding X1 is dependent on the base current which flows through the resistor R1 so that varying the value of R1 will control the magnitude of the current drawn by the primary winding. Since the voltage across the primary winding is fixed by the D.C. supply voltage, the feedback voltage is also fixed and is of a polarity which forward biases the transistor.

The collector current rises linearly until the transformer core saturates. The feedback voltage then falls and eventually there is insufficient drive in the base circuit to maintain the linearly rising current. The transistor begins to turn off and the magnetic field in the transformer core collapses. This produces a reverse EMF in the secondary and feedback windings and the resulting feedback voltage applies a violent negative bias to the grid of the transistor to switch the transistor hard off. As the induced EMF dies away to zero, the base of the transistor is again forward biased from the D.C. supply and the cycle is repeated. The switching rate, and therefore the frequency of oscillation, is largely determined by the value of the capacitor C1.

The windings X1 and X2 are wound as a single winding with a centre-tap connected to the positive input terminal. The number of turns in the primary winding X1 is chosen according to the value of the D.C. input voltage, the number of turns increasing with increasing input voltage. For input voltages of 6, 12, 24 or 50 volts the number of turns in the feedback winding X1 is made approximately equal to the number of turns in the primary winding. The resulting feedback voltage is therefore too high for it to be applied directly to the base of the transistor but it enables base current to be controlled merely by selecting a suitable value for the resistor R1. Thus only a proportion of the feedback voltage is available to drive the base of the transistor. The value of the resistor R1 is therefore chosen to provide approximately the same base current for different lengths of the lamp Z1 and the collector current is therefore maintained at a constant value of about 1 amp.

For an input voltage of 110 volts, there are 300 turns in the primary winding X1 and 400 turns in the feedback winding X2. For a 12V. input there are 30 primary and 30 feedback turns, for a 24V. input 60 primary and 60 feedback turns and for a 50V. input 125 primary and 125 feedback turns. The thickness of the wire which forms the primary and feedback windings should not be less than 30 SWG and is preferably 26 SWG.

Provided the number of turns in the primary winding X1 is increased as the input voltage is increased from 6V. to 50V, the number of turns in the secondary winding (the lamp ballast) can be kept the same (1200 turns) except for tubes or 8 ft. or more in length or tubes of less than 3 ft. For an input voltage of 110V. however, a ballast of 1500 turns will operate any tube length from 2 ft. up to 8 ft. This is because the switching rate of the transistor can be adjusted for the different tube lengths to compensate for the increased tube voltage which would otherwise be required as the tube length is increased.

The adjustment of the switching rate of the transistor (that is the frequency of the oscillations in the inverter circuit) is achieved by selecting an appropriate value for the capacitor C1. The circuit is stabilised at this frequency firstly by the resistor R1 and secondly by the design of the transformer illustrated in more detail in FIGS. 2 and 3.

Figure 2:
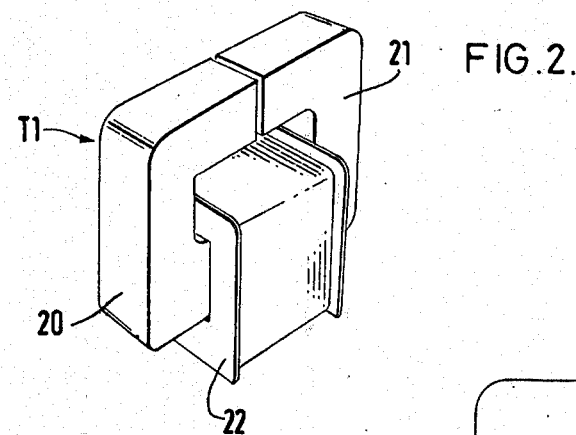
FIG. 2 is a perspective view of the output transformer in the inverter circuit of FIG. 1.
Figure 3:
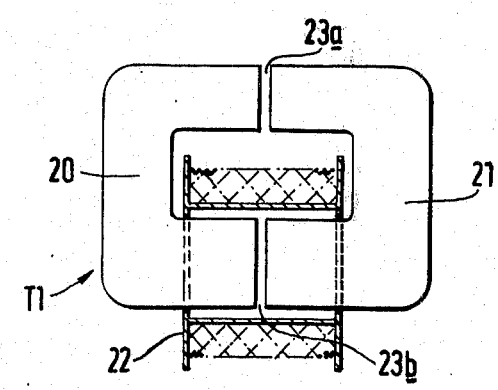
FIG. 3 is a sectional view through the transformer of FIG. 2.

In FIGS. 2 and 3 the transformer T1 is illustrated as being made up from two generally U-shaped cores 20 and 21 having their open ends facing one another to form a closed magnetic loop. The primary, secondary and feedback windings are wound around a bobbin 22 and one leg of each U-core is inserted into the bobbin. For frequencies in the region of 15 – 20 kHz the opposing ends of the two U-cores may contact one another, but at higher frequencies up to 50 – 60 kHz a pair of air gaps 23a and 23b are introduced between the opposing ends to assist tuning of the inverter at a particular frequency. In any event, the width of the air gap should not exceed 3 mm. In some cases the lower air gap 23b may be omitted. Each C-core is a laminated iron core with either 102 laminations of 0.003 inches or 78 laminations of 0.004 inches.

For certain applications the C-cores may be replaced by a ferrite rod of the same length as the bobbin on which the coils are wound. This is an "open magnetic circuit" and is therefore used only in "low saturation" conditions where the voltage and current are relatively low.

Referring back to FIG. 1, it is sometimes desirable to include either a resistor or a small diode of specific forward voltage-drop across the base-emitter junction of the transistor TR1.

In one alternative circuit, not illustrated, the resistor R1 is connected between the base and the collector of the transistor TR1 instead of between the base and the feedback winding X2.

We claim:

1. A method of lighting a cold cathode electric gas discharge lamp having a length of at least one foot, comprising connecting the lamp across the secondary winding of a voltage step-up transformer, energizing the primary winding of the transformer with a chopped D.C. voltage having a frequency of at least 12 kHz and a voltage which provides an output voltage from the secondary winding of the said transformer having an R.M.S. value no greater than 700 volts.

2. A method of lighting a cold cathode electric gas discharge lamp according to claim 1 in which the frequency lies in the range 20 kHz to 60 kHz.

3. A method of lighting a cold cathode electric gas discharge lamp as claimed in claim 1, in which the frequency is at least 15 kHz.

4. A lighting unit comprising a cold cathode electric gas discharge lamp having a length of at least one foot and a power unit therefor, the power unit comprising an inverter circuit including an output transformer having the discharge lamp connected across its secondary winding, a transistor having its main current-carrying electrodes connected between a D.C. power supply and the input of the primary winding and oscillating circuit means connected between the outlet of the primary winding and the control electrode of the transistor for oscillating at a predetermined frequency of at least 12 kHz and for supplying to the cold cathode electric discharge lamp a voltage having an R.M.S. value no greater than 700 volts.

5. A lighting unit as claimed in claim 4 in which the said frequency is at least 15 kHz.

6. A lighting unit according to claim 4 in which the primary winding of the transformer is wound with wire having a gauge in the range 24 SWG to 30 SWG.

7. A lighting unit according to claim 6 in which the gauge of the primary winding is in the range 24 SWG to 26 SWG.

8. A lighting unit according to claim 4 in which the transformer includes a pair of C-shaped saturable magnetic cores having their open ends facing one another to form a magnetic loop.

9. A lighting unit as claimed in claim 8 including an air gap in the magnetic loop.

10. A lighting unit according to claim 9 in which the width of the gap does not exceed 3 mm.

* * * * *